(12) United States Patent
Laugeois

(10) Patent No.: US 10,511,431 B2
(45) Date of Patent: Dec. 17, 2019

(54) TIME SYNCHRONISATION METHOD, INSENSITIVE TO POWER VARIATIONS, ASSOCIATED RECEIVER AND COMPUTER PROGRAM

(71) Applicant: COMMISSARIAT A L'ENERGIE ATOMIQUE ET AUX ENERGIES ALTERNATIVES, Paris (FR)

(72) Inventor: Marc Laugeois, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/148,472

(22) Filed: Oct. 1, 2018

(65) Prior Publication Data
US 2019/0109698 A1   Apr. 11, 2019

(30) Foreign Application Priority Data
Oct. 5, 2017   (FR) ...................................... 17 59347

(51) Int. Cl.
*H04B 1/16* (2006.01)
*H04L 7/00* (2006.01)
(Continued)

(52) U.S. Cl.
CPC ............. *H04L 7/0079* (2013.01); *H04B 1/16* (2013.01); *H04B 1/7077* (2013.01);
(Continued)

(58) Field of Classification Search
CPC ............. H04L 27/2662; H04L 27/2656; H04L 7/0079; H04L 7/007; H04L 27/2655;
(Continued)

(56) References Cited

U.S. PATENT DOCUMENTS

| 5,598,429 A | 1/1997 | Marshall |
| 9,350,413 B2 | 5/2016 | Chae et al. |
| 2007/0286314 A1* | 12/2007 | Herzinger ............... H04L 7/042 375/343 |

FOREIGN PATENT DOCUMENTS

EP        0 700 611 A1    3/1996

OTHER PUBLICATIONS

U.S. Appl. No. 16/006,190, filed Jun. 12, 2018, Maret, L. et al.
(Continued)

*Primary Examiner* — Rahel Guarino
(74) *Attorney, Agent, or Firm* — Oblon, McClelland, Maier & Neustadt, L.L.P.

(57) ABSTRACT

A method of synchronising a communication signal entering into a receiver. Each frame of the signal includes a learning symbol formed of N repetitions of a learning sequence. The method includes the determination of a total correlation signal by correlating the input signal with a correlation symbol formed of N repetitions of a correlation sequence corresponding to all or part of the learning sequence and duration $t_{sc}$, and the determination of a partial correlation signal by correlating the input signal with the correlation sequence. A peak of the total correlation signal is identified at an instant $t_{pct}$. At least one threshold is defined from the power of the peak of the total correlation signal, and the power of the partial correlation signal is compared here to the instants $t_{pct}-k*t_{sc}$, with k a whole number between 0 and N-1.

10 Claims, 4 Drawing Sheets

(51) Int. Cl.
*H04B 1/7075* (2011.01)
*H04B 1/7077* (2011.01)
*H04B 1/7087* (2011.01)
*H04L 27/26* (2006.01)

(52) U.S. Cl.
CPC ....... *H04B 1/7087* (2013.01); *H04B 1/70752* (2013.01); *H04L 7/007* (2013.01); *H04L 27/2663* (2013.01); *H04L 27/2675* (2013.01); *H04L 27/2688* (2013.01)

(58) Field of Classification Search
CPC ................ H04L 27/2665; H04L 7/042; H04L 2025/03414; H04L 27/2663; H04L 27/2675; H04L 27/2688; H04B 1/16; H04B 1/70752; H04B 1/7077; H04B 1/7087
See application file for complete search history.

(56) References Cited

OTHER PUBLICATIONS

French Preliminary Search Report dated Jun. 12, 2018 in French Application 17 59347 filed on Oct. 5, 2017 (with English Translation of Categories of Cited Documents).
Yan, D. et al. "Acquisition using Differentially Encoded Barker Sequence in DS/SS Packet Radio", Communications—gateway to globalization, Proceedings of the international conference on communications, 1995, pp. 5.

* cited by examiner

TIME SYNCHRONISATION METHOD, INSENSITIVE TO POWER VARIATIONS, ASSOCIATED RECEIVER AND COMPUTER PROGRAM

TECHNICAL FIELD

The field of the invention is that of data communication systems, and more specifically, that of time synchronisation of data packets made by a receiver of a communication system. The invention advantageously finds application in decoding signals carrying data frames where each frame comprises a learning symbol formed from the repetition of a learning sequence, like for example OFDM ("Orthogonal Frequency Division Multiplex") signals, in particular, OFDM signals with a CP ("Cyclic Prefix") or FDE ("Frequency Domain Equalisation").

PRIOR ART

Within a receiving chain of a receiver of a wireless communication system, data from an antenna enter into a gain control unit which has the role of adjusting the gain of an RF amplifier such that an analogue-to-digital converter arranged downstream of the amplifier works in the linear zone thereof.

Once this gain is adjusted, a time synchronisation of the entering dataflow must be made, which consists of determining the frame start instants in the signal received. The data on which a synchronisation algorithm operates must not vary in power. The gain control and time synchronisation units of a decoding chain are therefore closely linked.

Yet, the gain adjusted by the gain control unit is not necessarily precise and depends on several factors, such as the precision of the "digital" power estimation at the output of the converters. Thus, the synchronisation algorithm must be able to accommodate the power differences from frame to frame.

A conventional synchronisation algorithm is known from the article, "Robust Frequency and Timing Synchronization for OFDM", by Timothy M. Schmidl and Donald C. Cox, IEEE TRANSACTIONS ON COMMUNICATIONS, VOL. 45, NO. 12, DECEMBER 1997. This algorithm is based on two time repetitions within the OFDM symbol. An autocorrelation enables, from detecting the maximum thereof, to determine the position of the synchronisation instant by means of calculating the average quadratic error around the ideal synchronisation point.

SUMMARY OF THE INVENTION

The invention aims to propose a synchronisation method of which the sensitivity to gain adjustment imprecisions is reduced and of which the detection performances of the ideal synchronisation instant are improved because of this.

To this end, the invention proposes a method for synchronising a signal entering into a receiver of a communication system, the entering signal carrying data frames and each frame comprising a learning symbol formed of N repetitions of a learning sequence.

The method comprises the determination of a total correlation signal by correlating the input signal with a correlation symbol formed of N repetitions of a correlation sequence corresponding to all or part of the learning sequence, and the determination of a partial correlation signal by correlating the input signal with the correlation sequence.

The method continues with the identification of a peak of the total correlation signal at an instant $t_{pct}$, called date of the total correlation peak, and the definition of at least one threshold from the power of the peak of the total correlation signal. The method comprises the comparison of the power of the partial correlation signal to the at least one threshold and, according to the result of said comparison, the synchronisation can be validated by indicating the start time of the first symbol following the learning symbol in the frame from the date of the total correlation peak.

Certain preferred but non-limiting aspects of this method are as follows:

- the comparison of the power of the partial correlation signal to the at least one threshold comprises the comparison of the power of the partial correlation signal at the instants tpct−k*tsc preceding the total correlation peak date to the at least one threshold, the instants tpct−k*tsc being called partial correlation peak dates and tsc being the duration corresponding to the correlation sequence and k, an integer between 0 and N−1;
- it comprises the definition of a high threshold and a low threshold and the synchronisation is validated when the power of the partial correlation signal at each of the partial correlation peak dates is between the high threshold and the low threshold;
- the low threshold is a fraction of the power of the peak of the total correlation signal and the high threshold is a multiple of the power of the peak of the total correlation signal;
- the low threshold and the high threshold are symmetrical with respect to the power of the peak of the total correlation signal;
- it further comprises a step of invalidating the synchronisation when the partial correlation signal has, between the instants $t_{pct}-N*t_{sc}$ and $t_{pct}$ and outside of time windows each comprising one of the partial correlation peak dates, a power greater than the power of the partial correlation signal at one of the partial correlation peak dates;
- it further comprises a step of invalidating the synchronisation when the power of the partial correlation signal at one of the partial correlation peak dates is less than the power of the total correlation signal at the total correlation peak date;
- it comprises a prior step of adjusting the gain of an amplifier of the receiver consisting in establishing a stationary gain setpoint.

BRIEF DESCRIPTION OF THE DRAWINGS

Other aspects, aims, advantages and characteristics of the invention will appear best upon reading the following detailed description of preferred embodiments of it, given as a non-limiting example, and made in reference to the appended drawings, on which.

DETAILED DESCRIPTION OF SPECIFIC EMBODIMENTS

The invention is based on a method of synchronising an input signal in a receiver of a communication system. This method is implemented in a time synchronisation unit that equip the receiver, the latter also comprising a gain control unit.

Figure 1:
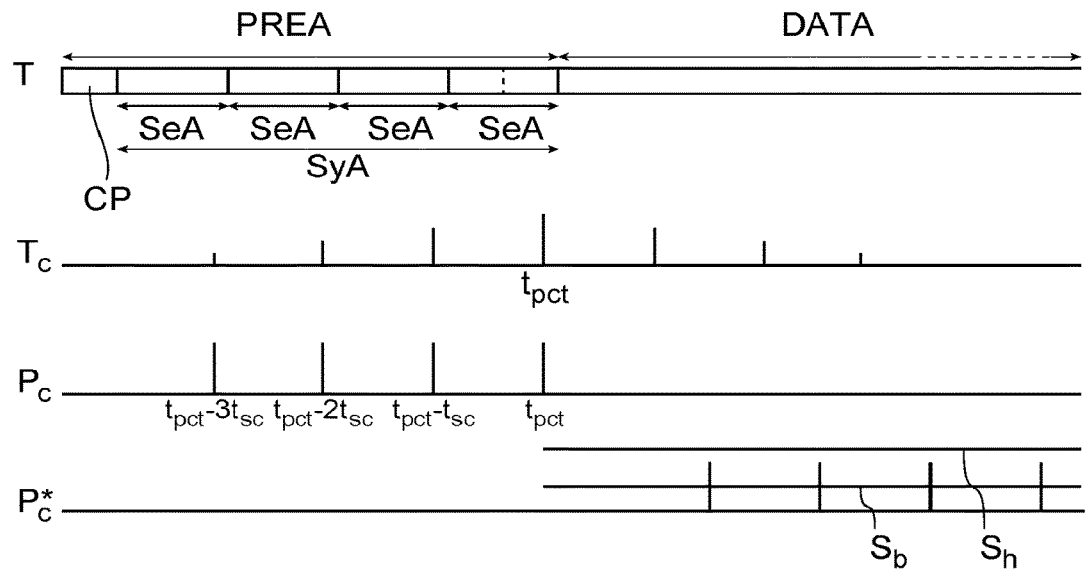
FIG. 1 is a diagram illustrating a data frame of the input signal, and more specifically, the preamble thereof, as well as the total correlation signal and the partial correlation signal used in the scope of the invention.

The input signal carries data frames. As represented in FIG. 1, each frame T comprises a preamble PREA followed by a portion DATA carrying a succession of data symbols. The preamble PREA comprises at least one learning symbol SyA dedicated to the synchronisation search which is formed of N repetitions of a learning sequence SeA (N being an integer greater than or equal to 2; N=4 in the example in FIG. 1). The learning sequence SeA comprises Ns samples, for example 16 samples. The learning symbol SA, as well as the data symbols, can be preceded by a cyclic prefix CP.

The synchronisation according to the invention is implemented once the gain adjustment phase has been completed. The method thus comprises a prior step of adjusting the gain of an amplifier of the receiver consisting of establishing a stationary gain setpoint. Once the stationary gain setpoint is established, a time window is opened. Throughout this window, the synchronisation algorithm is activated. Upon the expiry of this window, if the synchronisation is validated, the gain is maintained throughout the frame. In the opposite case, the gain control unit regains control to carry out a new gain adjustment phase.

The method according to the invention comprises the extraction of a correlation sequence from the learning sequence. The correlation sequence thus corresponds to all or part of the learning sequence and has Ls samples (Ls≤Ns). In the below, to make it simple in the description, the example Ls=Ns will be considered.

The method comprises the determination of a total correlation signal Tc and of a partial correlation signal Pc. The total correlation signal Tc is determined by correlating the input signal with a correlation signal formed of N repetitions of the correlation sequence. The correlation symbol corresponds to the learning symbol SyA in the example considered, where the correlation sequence specifically corresponds to the learning sequence. The partial correlation signal Pc is determined by correlating the input signal with the correlation sequence (which specifically corresponds to the learning sequence SeA in the example considered).

The method is followed by a step of identifying a peak (a maximum) of the total correlation signal Tc at an instant $t_{pct}$, called date of the total correlation peak. A peak is considered as good if the total correlation signal has no new maximum in a window of a symbol from the last maximum.

Then, at least one threshold is defined from the power of the peak of the total correlation signal. The method typically comprises the definition, relating to the power of the peak of the total correlation signal, both a low threshold Sb and a high threshold Sh. The low threshold is a fraction of the power of the peak of the total correlation signal and the high threshold is a multiple of the power of the peak of the total correlation signal. The low threshold and the high threshold can be symmetrical with respect to the power of the peak of the total correlation signal. For example, they can be set respectively to −X dB and +X dB of the power of the peak of the total correlation signal, with X, a strictly positive value. These thresholds condition the probabilities of detection and of false alarm of the synchronisation.

The method then comprises a step of comparing the at least one threshold of the power of the partial correlation signal Pc at the instants $t_{pct}-k*t_{sc}$ preceding the total correlation peak date. The instants $t_{pct}-k*t_{sc}$ are called partial correlation peak dates, $t_{sc}$, is the duration corresponding to the correlation sequence and k is an integer between 0 and N−1. The position of the peak of the total correlation signal indeed enables to determine the relative positions of the peaks of the partial correlation signal, and the method proposes to analyse these positions to verify that they correctly correspond to peaks.

In a practical embodiment of the invention requiring a sequencing of the steps (namely identification of the peak and calculation of the threshold, validation of this peak—that is a symbol-, and finally use of the peak), the partial correlation signal Pc is delayed for a duration corresponding to the duration of the preamble PREA and forms a delayed partial correlation signal Pc*. Thus, the position of the peak of the total correlation signal (at $t_{pct}$) enables to predetermine the relative positions of the peaks of the delayed partial correlation signal (at $t_{pct}+t_{cp}+m*t_{sc}$, where $t_{cp}$ corresponds to the duration of the cyclic prefix and m is a whole number between 1 and N). Thus, once the peak of the total correlation signal has been validated, a time window of a duration of a symbol (N*Ns samples) can be opened to proceed with examining the partial correlation signal Pc* and verify whether peaks are correctly observed at the predetermined positions.

The examination of the partial correlation signal Pc or of the delayed partial correlation signal Pc* at the above-mentioned dates are perfectly equal, the power of the partial correlation signal Pc at the instants $t_{pct}-k*t_{sc}$ preceding the total correlation peak date being identical to the power of the delayed partial correlation signal Pc* at the instants at $t_{pct}+t_{cp}+m*t_{sc}$ following the total correlation peak date.

According to the result of the comparison step, the synchronisation can be validated and the start time of the first symbol following the learning symbol in the frame can be determined from the date of the total correlation peak. The synchronisation is more specifically validated when the power of the partial correlation signal at each of the partial correlation peak dates is between the high threshold and the low threshold (i.e. N peaks are observed, considered as being valid).

In the scope of the invention, the at least one threshold is determined relative to the power of the total correlation peak. Because of this, the synchronisation is made insensitive to gain adjustment imprecisions. Moreover, the search of N valid peaks makes the synchronisation highly reliable in the sole presence of noise. Indeed, this plurality of valid peaks creates an overlapping, whereas it is not very probably that N "false" peaks have a power in the range of the low and high thresholds.

Figure 2:
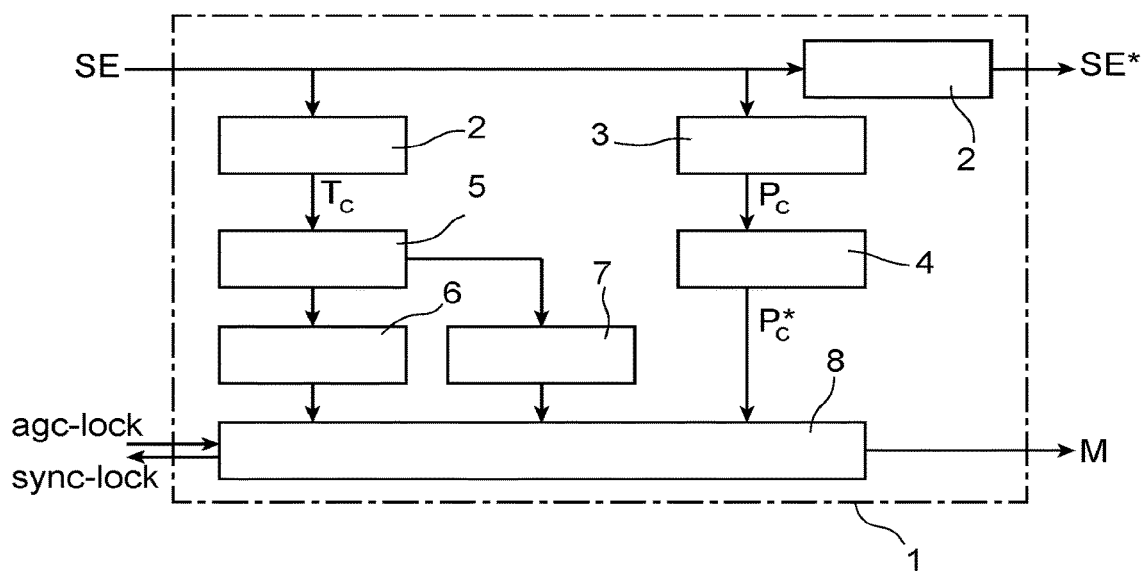
FIG. 2 is a diagram of a time synchronisation unit configured for a possible implementation of the method according to the invention.

In FIG. 2, a diagram of a time synchronisation unit 1 has been represented, configured for a possible implementation of the method defined above. The unit 1 receives a flow of input data (input signal SE) and provides, at the output, an output signal SE* corresponding to the input signal SE delayed by means of a first timer 2 with a delay corresponding to the duration necessary for the synchronisation calculations (this duration in particular integrating the analysis of the delayed partial correlation signal at the predetermined peak dates).

The unit 1 moreover comprises a first correlator 2 configured to determine the total correlation signal Tc, a second correlator 3 configured to determine the partial correlation signal Pc and a second timer 4 configured to provide the delayed partial correlation signal Pc*.

The unit 1 also comprises a module for analysing 5 the total correlation signal Tc configured to identify a maximum of the total correlation signal. This module 5 updates the maximum of the total correlation signal at each input sample. A module for calculating the threshold 6 is configured to calculate the at least one threshold Sb, Sh from the maximum of the total correlation signal updated at each input sample. When a new maximum is identified, a counter 8 is launched for a duration corresponding to the duration of a symbol. When this counter 8 is launched, a module 9 for analysing peaks proceeds to the comparison of the power of the delayed partial correlation signal Pc* (at the predetermined peak dates by identifying the new maximum, i.e. the launch date of the counter 8) with the at least one threshold, and where appropriate, to the validation of the synchronisation. When the synchronisation is validated, the start time of the first symbol following the learning symbol in the frame is determined and the module 9 provides, at the output, a marker M of the start of the data packet DATA.

The module 9 for analysing peaks is only activated during a time window launched following the establishment of a stationary gain setpoint by the gain control unit. An item of information establishing a stationary gain setpoint agc-lock is, for that, provided to the module 9 by the gain control unit. If the synchronisation is validated by the module 9 during the time window of inactivity thereof, the gain is maintained throughout the frame. In the opposite case, the gain control unit regains control to carry out a new gain adjustment phase. An item of information validating the synchronisation sync-lock is, for that, provided to the gain control unit by the module 9.

Figure 3:
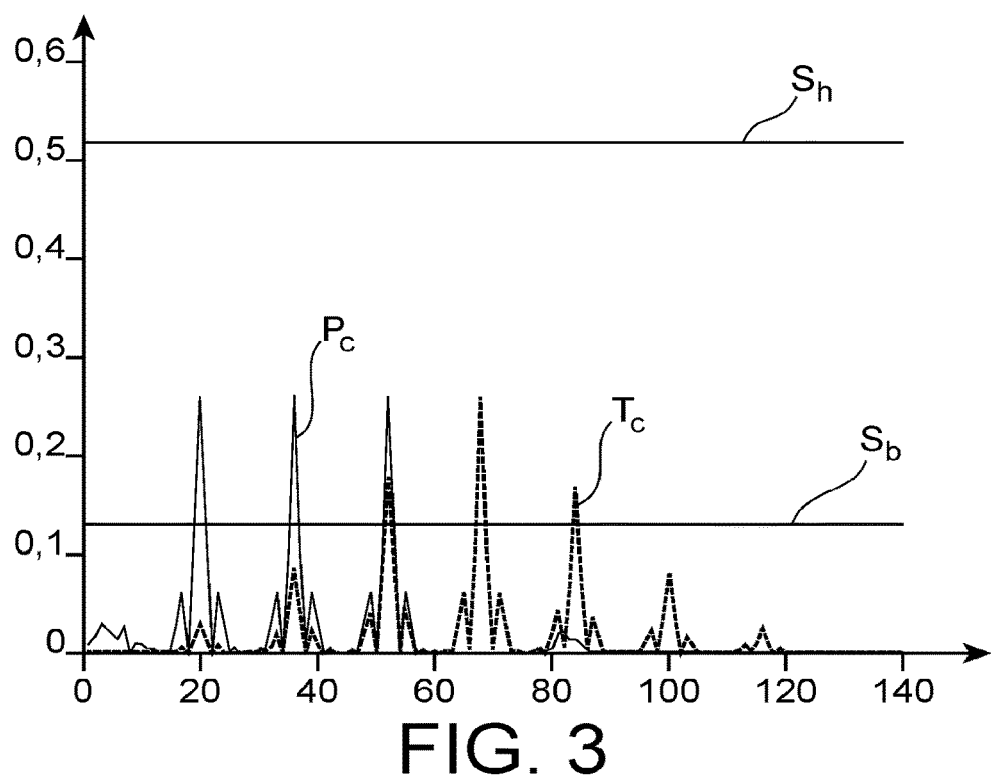
FIGS. 3 and 4 illustrate timing profiles of total correlation and partial correlation signals, respectively in the absence of and in the presence of noise.
Figure 4:
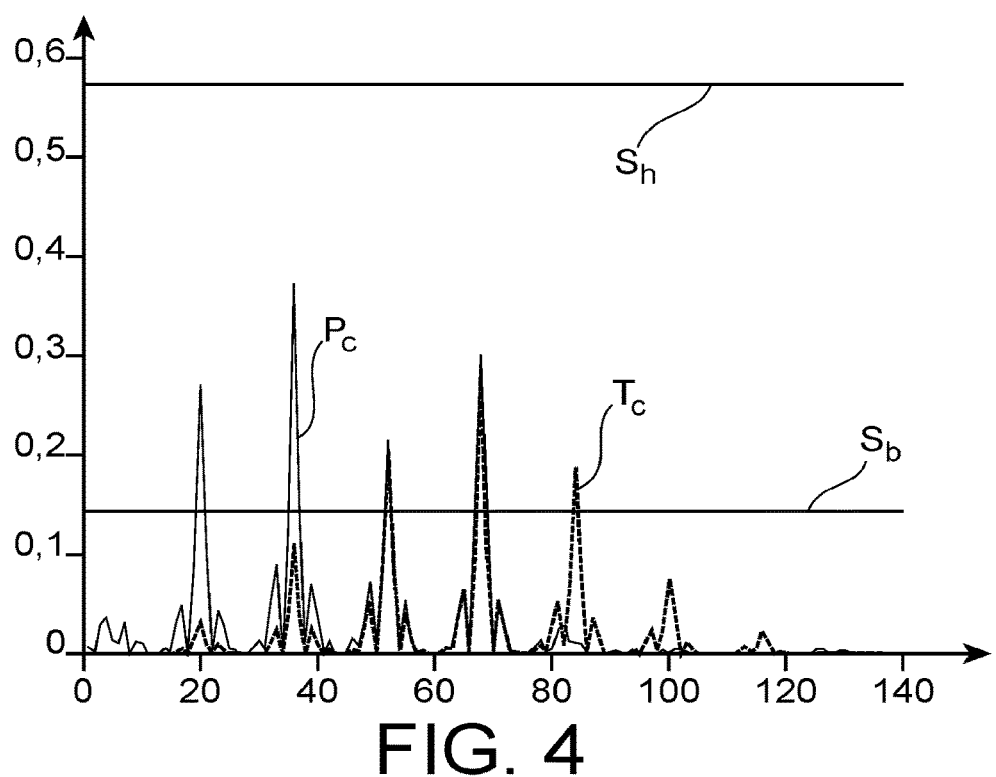

In FIGS. 3 and 4, timing profiles of total correlation Tc (as a dotted line) and of partial correlation Pc (as a solid line) signals have been represented, respectively in the absence and in the presence of noise. In these figures, the abscissa axis represents time, expressed in terms of samples. FIG. 3 presents a correlation profile, without the signal being impaired with noise, the last partial correlation peak is in the same position as the total correlation peak, and in this case, of the same amplitude (because of the absence of noise). The signal-to-noise ratio is 10 dB in the example in FIG. 4. In each of these figures, 4 "valid" partial correlation peaks are observed in the sense that the power of the partial correlation signal, at the partial correlation peak dates determined from the total correlation peak date, is well within the range defined by the low and high thresholds. The synchronisation is therefore correctly done.

Figure 5:
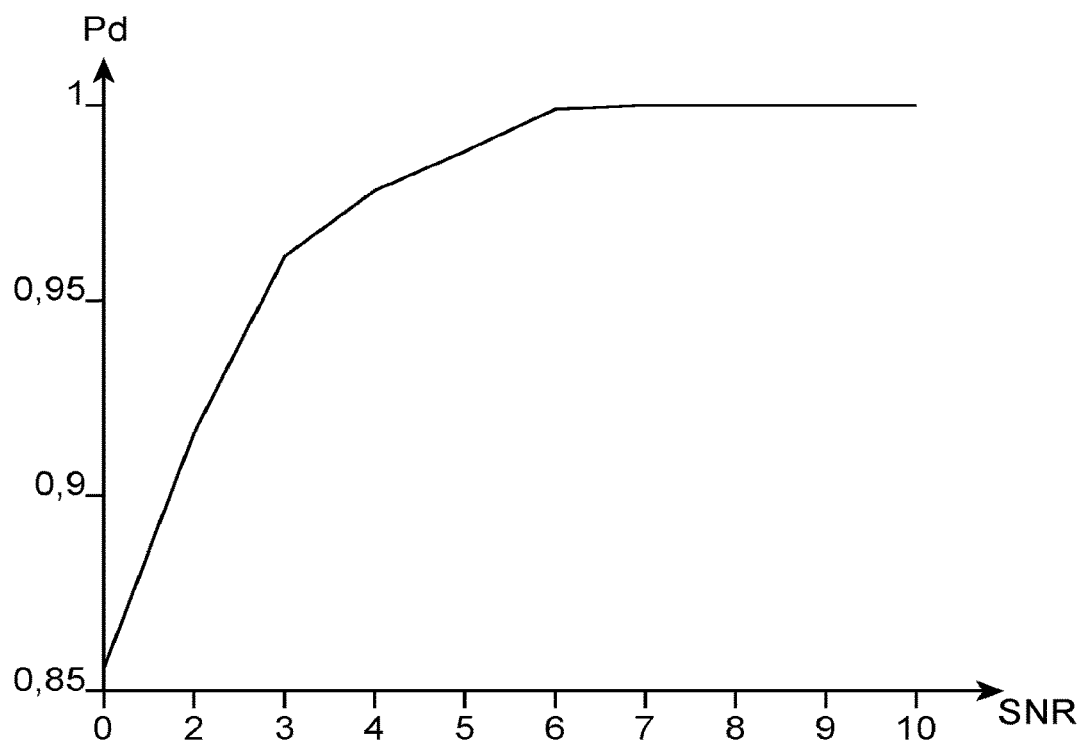
FIG. 5 is a graph representing the progression of the probability of detecting the ideal synchronisation instant according to the noise-to-signal ratio of the input signal.

In FIG. 5, the probability of detecting the ideal synchronisation instant according to the signal-to-noise ratio of the input signal has been represented. The correlation sequence is identical to the learning sequence and has 16 samples. The high and low thresholds are positioned at +/−3 dB of the power of the total correlation peak. It is observed, that for a signal-to-noise ratio greater than 7 dB, the detection is 100%. With this value matching the binary error curve of a modulation QPSK, the decoding of the data therefore occurs before the timing synchronisation deteriorates.

Figure 6:
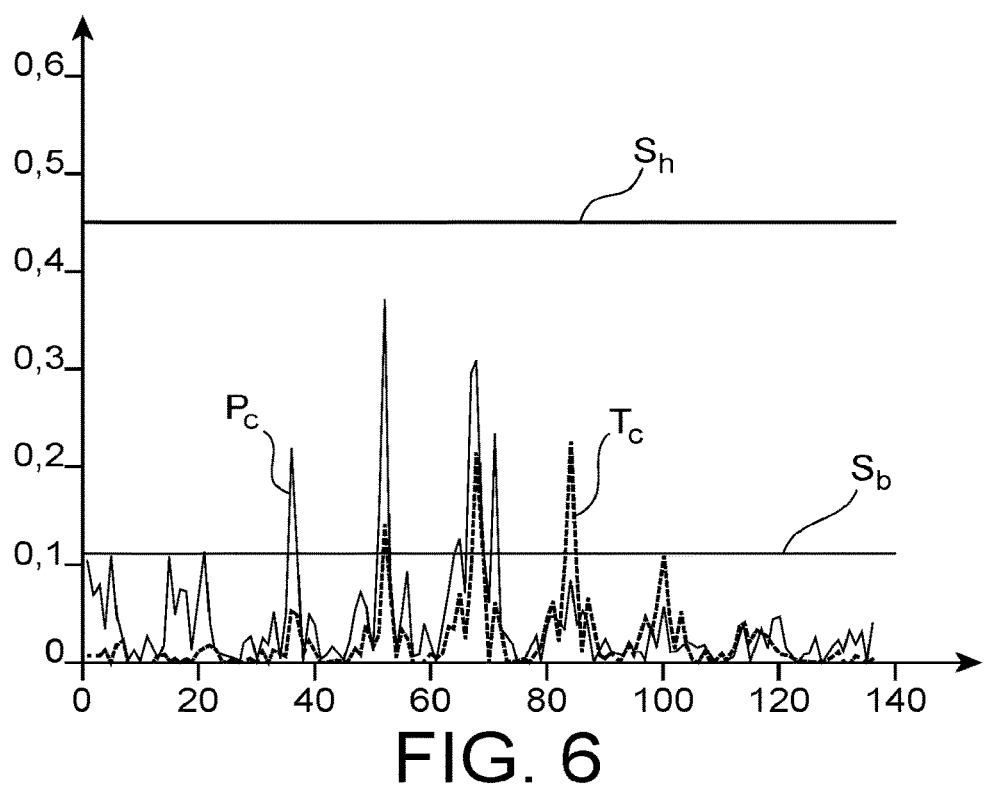
FIGS. 6 and 7 represent timing profiles of total correlation and partial correlation signals leading to a synchronisation failure.
Figure 7:
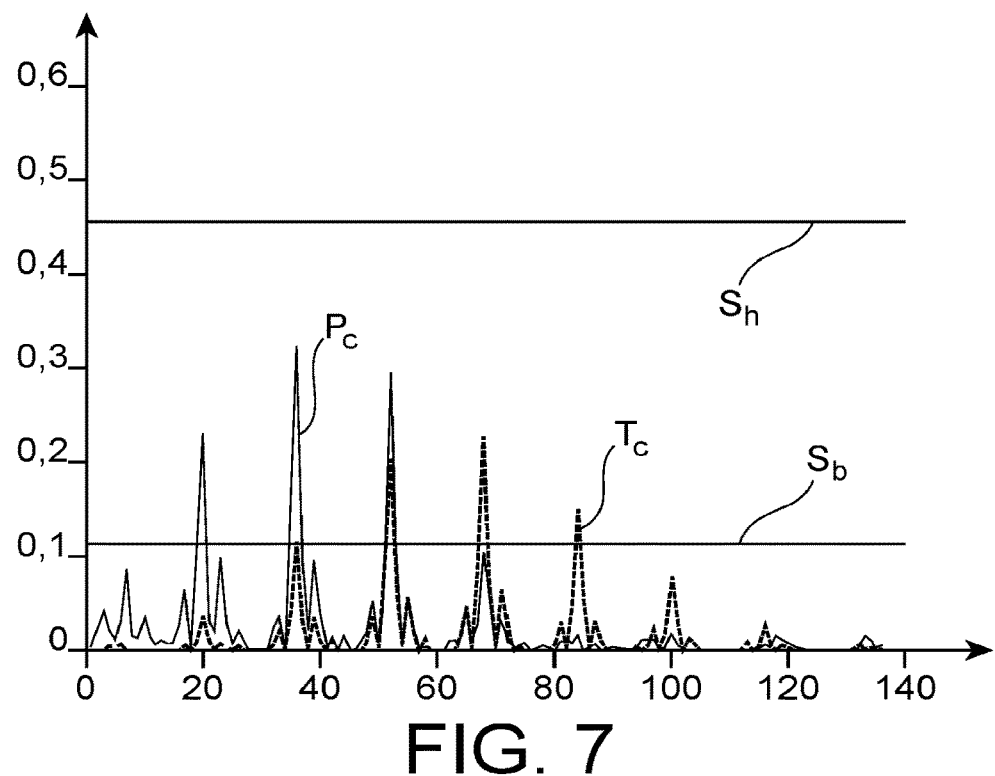

In FIGS. 6 and 7, timing profiles of total correlation and partial correlation signals leading to a synchronisation failure have been represented.

In FIG. 6, a secondary maximum of the total correlation is observed (in position 84), of which the power is greater than that of the principal maximum of the total correlation (in position 64). The synchronisation algorithm attaches to a "false" total correlation peak, N valid partial correlation peaks are not found from this "false" peak and the synchronisation fails.

In FIG. 7, the principal maximum of the total correlation is identified in position 64, but the power of the partial correlation signal at this date is less than the low threshold such that the synchronisation fails.

Figure 8:
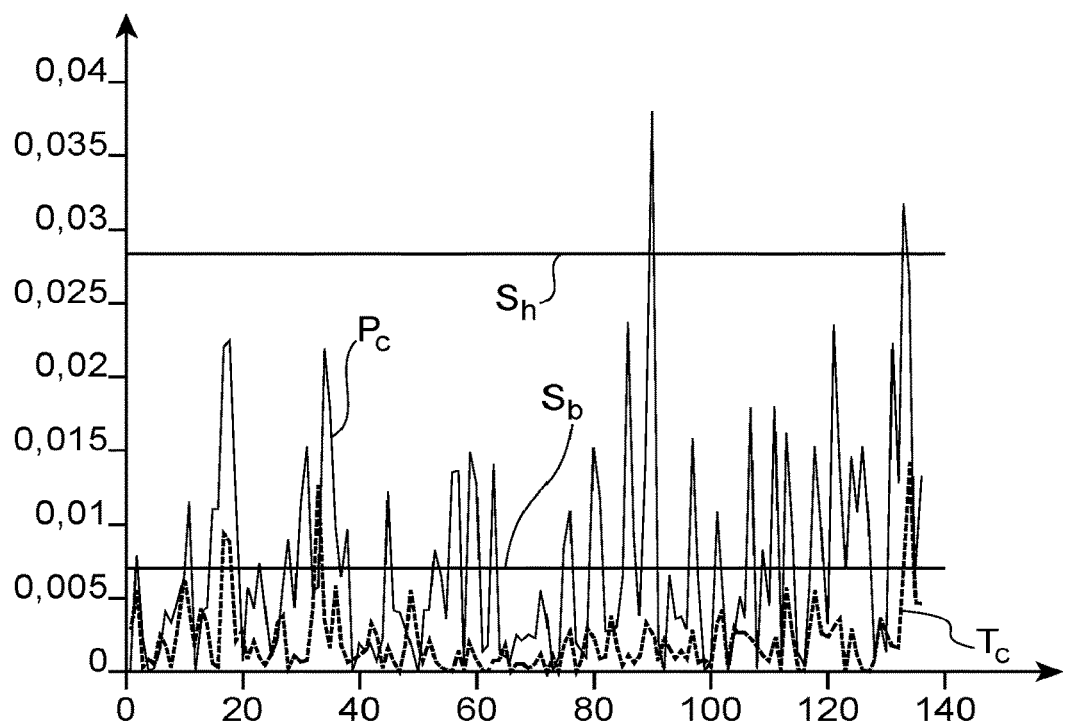
FIG. 8 represents timing profiles of total correlation and partial correlation signals leading to the incorrect validation of a synchronisation, this incorrect validation could be counteracted in an alternative embodiment of the invention.

In absence of signal, and by taking the same threshold values at +/−3 dB, a probability of false alarm of 10% has been observed. FIG. 8, in this regard, illustrates a false alarm case. In this figure, the peak with the strongest power of the total correlation signal is found in position 134, leading to an examination of the power of the partial correlation signal at positions 134, 118, 102 and 84. The low threshold is set at 0.0071 and the high threshold at 0.0284 (+/−3 dB). The power of the partial correlation signal at the above-mentioned positions is between the low and high thresholds, such that the synchronisation is validated. Yet, these positions do not correspond to the peaks of the partial correlation signal and the validation of the synchronisation is therefore incorrect.

To counteract such an incorrect validation, in an alternative embodiment of the invention, the method further comprises a step of invalidating the synchronisation when the partial correlation signal has, between the instants $t_{pct}-N*t_{sc}$ and $t_{pct}$ and outside of time windows each comprising one of the partial correlation peak dates, a power greater than the power of the partial correlation signal at one of the partial correlation peak dates.

Revisiting the example in FIG. 8, that time windows around dates of partial correlation peaks are considered, for example, of three samples, thus windows corresponding to the positions [133-135], [117-119], [101-103] and [85-87]. It is verified whether in a window of duration 1 symbol (that is the positions in the range [62-134] by considering a symbol formed of a cyclic prefix of 8 samples and 4 repetitions of a learning sequence of 16 samples), and outside of the windows around partial correlation peak dates, there are partial correlation values greater than those leading to the detection. This is the case in the example in FIG. 8, and the synchronisation is thus invalidated.

In another embodiment aiming to reduce the false alarm ratio, implemented independently (or not) from the embodiment discussed above, the method comprises a step of invalidating the synchronisation when the power of the partial correlation signal at one of the partial correlation peak dates is less than the power of the total correlation signal at the total correlation peak date. By jointly implementing these two embodiments, the false alarm ratio is reduced to 0.

The invention is not limited to the method defined above but also extends to a receiver of a communication signal comprising means configured to implement the method, this receiver could for example be equipped with the timing synchronisation unit of FIG. 2. Plus, the invention also extends to a computer program product comprising code instructions for the execution of the steps of the synchronisation method when said program is executed on a computer.

The invention claimed is:

1. A method for synchronising an input signal in a receiver of a communication system, the input signal carrying data frames and each data frame comprising a learning symbol formed of N repetitions of a learning sequence, the method comprising:
   determining a total correlation signal by correlating the input signal with a correlation symbol formed of N repetitions of a correlation sequence corresponding to all or part of the learning sequence;
   determining a partial correlation signal by correlating the input signal with the correlation sequence;
   identifying a peak of the total correlation signal at an instant $t_{pct}$, called total correlation peak date;
   defining at least one threshold from a power of the peak of the total correlation signal;
   comparing a power of the partial correlation signal to the at least one threshold; and
   according to a result of the comparing, validating a synchronisation and determining a start time of a first symbol following the learning symbol in a data frame from the total correlation peak date.

2. The method according to claim 1, wherein comparing the power of the partial correlation signal to the at least one threshold comprises comparing the power of the partial correlation signal at instants $t_{pct}-k*t_{sc}$ preceding the total correlation peak date to at least one threshold, the instants $t_{pct}-k*t_{sc}$ being called partial correlation peak dates and $t_{sc}$ being a duration corresponding to the correlation sequence and k a whole number between 0 and N−1.

3. The method according to claim 2, wherein the synchronisation is validated when the power of the partial correlation signal at each of the partial correlation peak dates is between a high threshold and a low threshold.

4. The method according to claim 3, wherein the low threshold is a fraction of the power of the peak of the total correlation signal and the high threshold is a multiple of the power of the peak of the total correlation signal.

5. The method according to claim 4, wherein the low threshold and the high threshold are symmetrical with respect to the power of the peak of the total correlation signal.

6. The method according to claim 2, further comprising invalidating the synchronisation when the partial correlation signal has, between instants $t_{pct}-N*t_{sc}$ and $t_{pct}$ and outside of time windows each comprising one of the partial correlation peak dates, a power greater than the power of the partial correlation signal at one of the partial correlation peak dates.

7. The method according to claim 2, further comprising invalidating the synchronisation when the power of the partial correlation signal at one of the partial correlation peak dates is less than the power of the total correlation signal at the total correlation peak date.

8. The method according to claim 1, further comprising adjusting a gain of an amplifier of the receiver that consists in establishing a stationary gain setpoint.

9. A receiver for synchronising an input signal, the input signal carrying data frames and each data frame comprising a learning symbol formed of N repetitions of a learning sequence, the receiver comprising:
   circuitry configured to
      determine a total correlation signal by correlating the input signal with a correlation symbol formed of N repetitions of a correlation sequence corresponding to all or part of the learning sequence,
      determine a partial correlation signal by correlating the input signal with the correlation sequence,
      identify a peak of the total correlation signal at an instant $t_{pct}$, called total correlation peak date,
      define at least one threshold from a power of the peak of the total correlation signal,
      compare a power of the partial correlation signal to the at least one threshold, and
      according to a result of comparing, validate a synchronisation and determine a start time of a first symbol following the learning symbol in a data frame from the total correlation peak date.

10. A non-transitory computer-readable storage medium including computer executable instructions, wherein the instructions, when executed by a computer, cause the computer to perform a method for synchronising an input signal, the input signal carrying data frames and each data frame comprising a learning symbol formed of N repetitions of a learning sequence, the method comprising:
   determining a total correlation signal by correlating the input signal with a correlation symbol formed of N repetitions of a correlation sequence corresponding to all or part of the learning sequence;
   determining a partial correlation signal by correlating the input signal with the correlation sequence;
   identifying a peak of the total correlation signal at an instant $t_{pct}$, called total correlation peak date;
   defining at least one threshold from a power of the peak of the total correlation signal;
   comparing a power of the partial correlation signal to the at least one threshold; and
   according to a result of the comparing, validating a synchronisation and determining a start time of a first symbol following the learning symbol in a data frame from the total correlation peak date.

* * * * *